May 24, 1938.  E. C. HORTON  2,118,792

SNAP ACTION

Filed May 1, 1936

INVENTOR
Erwin C. Horton,
BY
Beau, Brooks, Buckley & Beau.
ATTORNEYS

Patented May 24, 1938

2,118,792

UNITED STATES PATENT OFFICE 2,118,792

SNAP ACTION

Erwin C. Horton, Hamburg, N. Y., assignor to Trico Products Corporation, Buffalo, N. Y.

Application May 1, 1936, Serial No. 77,456

10 Claims. (Cl. 74—100)

This invention relates to a power switching or valve action for electric or fluid motors, such as for windshield cleaners, fuel pumps, and the like, and is particularly designed for use in small motors, such as might be useful for a motor vehicle accessory.

Various designs of snap action have heretofore been made wherein a spring has been utilized to effect a quick shift of the power or pressure differential for reversing the power drive of a reciprocatory type of motor. The previous snap action has usually embodied a spring which was moved bodily across a dead center position immediately prior to the shift of the snap mechanism. This shift not only necessitated additional power because the spring was required to be tensioned to a considerable degree, but it was also possible for the snap mechanism to arrest itself in a dead center position and thereby stop the motor.

The present invention has for its object to provide a snap action which obviates these objections, and further, to provide a snap action which is efficient in operation and of simplified construction.

The invention comprehends the direct application of the spring force to impart the shifting movement of the power switching element, and it comprises the salient features of construction and the arrangements and combinations of parts hereinafter more fully described, reference being had to the accompanying drawing, wherein—

Figure 1:
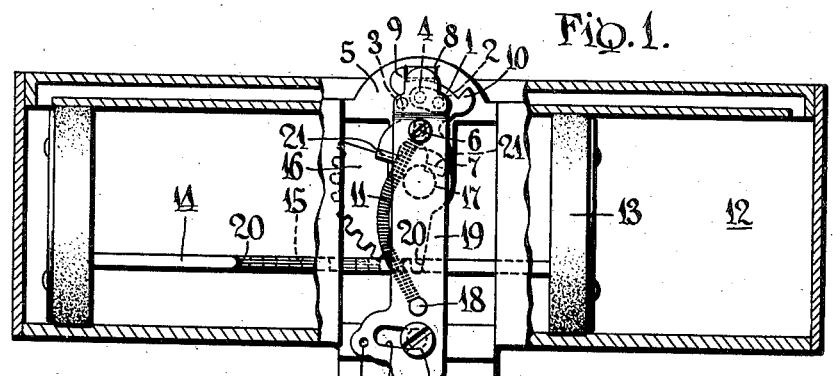
Fig. 1 is an elevation of the improved snap action applied to a fluid type of motor, portions of the latter being in section.
Figure 2:
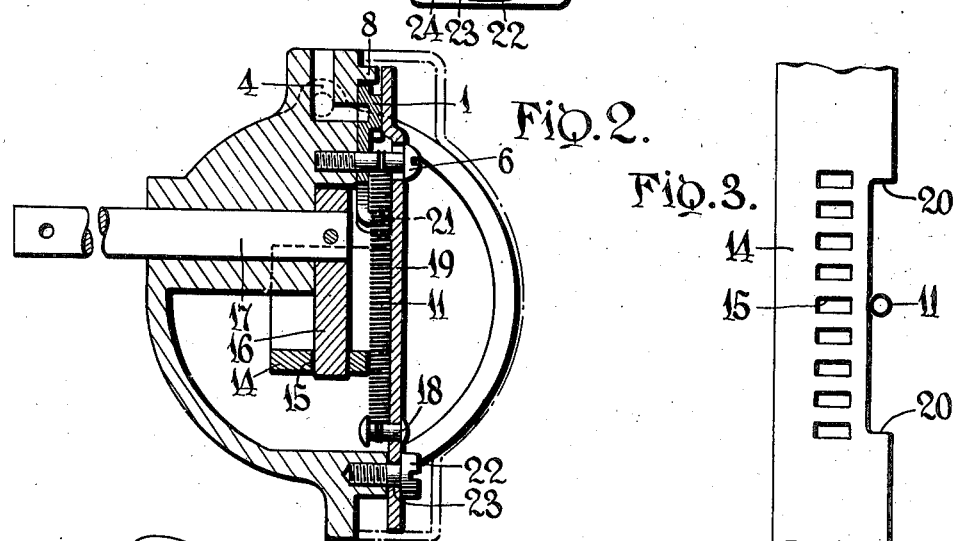
Fig. 2 is a transverse sectional view through the snap action.

Referring more particularly to the drawing, the numeral 1 designates a power switching member in the form of a valve for alternately connecting the chamber ports 2 and 3 with a power line port 4, which ports open through a common valve seat 5. The valve is movably mounted as on a pivot 6 which projects from the body 7, and the valve is limited in its movements by the oppositely facing ends of a stop 8 that is interposed between the shoulders 9 and 10 on the valve. A spring 11 is provided for shifting or rocking the valve back and forth between its two operative positions; in one position the valve connecting the power port 4 to the piston chamber 12 at one side of the piston 13, and in the other position connecting such power port to the chamber at the opposite side of the piston. The piston in this particular illustration embodies spaced packings which are connected by a link 14 that is provided with a rack 15 for meshing engagement with a pinion 16 on a power take-off shaft 17.

The spring has its opposite ends anchored for pivotal movement, as on pins 6 and 18, and its intermediate portion bowed sideways, the distance between the anchor pins being less than the normal length of the spring, so that when the spring is mounted, it will be held under compression and, therefore, bowed laterally. The line of spring force is shifted back and forth by buckling the bow first to one side and then to the opposite side of the plane of anchorage for the spring ends, a guide plate 19 serving to constrain or guide the bowing action to a plane substantially parallel with the movement of the member 14. This piston actuated member 14 is provided with spaced actuator shoulders 20, which alternately engage the bowed portion of the spring to effect the desired shift in the line of spring force, said shoulders 20 contacting the bowed spring adjacent one of its anchorages. This will cause such adjacent end portion of the spring to pivot about the adjacent anchorage and across the plane of spring anchorage independently of the remaining portion of the spring which latter portion will follow with a sinuous or serpentine movement and terminate in a final whipping action as the trailing end is snapped across such plane. This final whip of the spring is utilized to effect the desired change-over in the application of the power and to this end a pair of shoulders 21 may be provided on the valve 1 in the path of the whipping portion of the spring to be alternately engaged thereby.

This provides a construction in which the spring force progressively moves from one end to the opposite, culminating in a final whipping away from one valve shoulder 21 and against the companion shoulder to quickly shift the valve to its new position, wherein the valve stop shoulder 10 will be in engagement with the stop 8 and the formerly unconnected port 3 will be in communication with the power supply port 4, while the formerly connected port 2 will be open to the atmosphere. This will result in a reverse movement of the piston until the spring is again engaged from the opposite direction by the trailing actuator shoulder 20.

As a means for arresting the action of the motor the confining plate 19 is pivotally mounted on the pin 6 and supports the pin 18 so that the latter may be shifted to one side or to a position across which the actuator 14 cannot effectively shift the spring. A limiting pin 22 operating in a slot 23 in the plate 19 will serve to define the extent of pivotal movement of the confining plate from a motor arresting position to a motor operating position. The confining plate may therefore be termed a parking member and is provided with an eye 24 in which may be engaged a push and pull wire leading to an accessible point.

Figure 3:
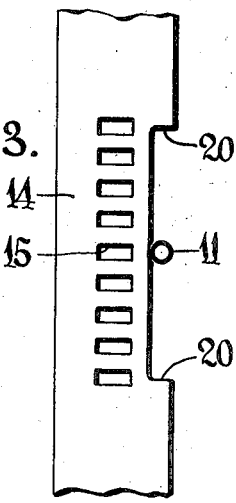
Fig. 3 is a fragmentary detail of a part of the motor.
Figure 4:
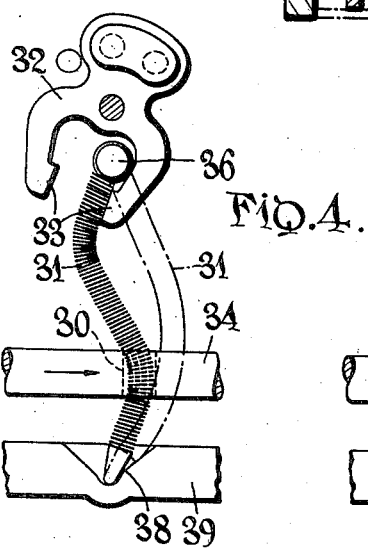
Figs. 4 and 5 are schematic views of the invention embodied in another form of power switching embodiment.
Figure 5:
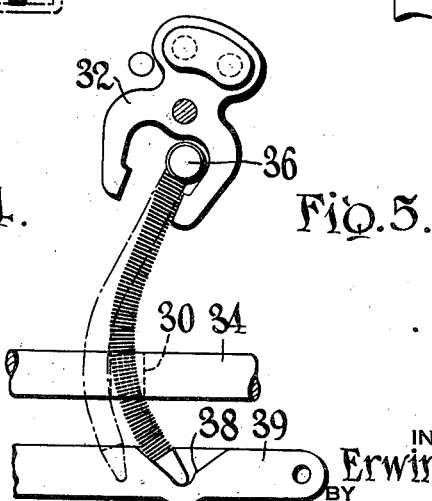

Figs. 3 and 4 show a slightly modified embodiment of the invention and more clearly depict the sinuous whipping action of the spring. In these views the spring 31 is anchored at one end by a pin 36 and at its opposite end in a seat 38 provided in the parking or arresting member 39. The actuator 34 for initiating the whipping action of the spring may be provided with an opening 30 to receive and guide the spring in its movements. In Fig. 4 the spring is shown in solid lines as having begun its serpentine progression and moves to the broken line position. In Fig. 5 the parking member is depicted in its two positions. The power switching member 32 has the driven shoulders 33 to receive the impact and driving force of the spring in its final whip.

In both forms of the invention illustrated the spring movement from adjacent one point of anchorage toward the other point of anchorage is in the nature of a wave of motion which travels from the point of power application to the point of work application. The initial movement of the spring forms the wave and imparts a motion thereto which travels toward the opposite end of the spring where its work is accomplished. The spring being cramped between its two anchorages so as to bow to one side of the plane of the anchors, creates the work imparting wave as it buckles across to its opposite bowed position.

With the improved snap action it is impossible to obtain a "dead center" position wherein the spring will fail to act in either direction since the spring begins its independent movement, free of the actuator, while the latter is still moving, and because the spring does not have to go through an abnormal compression or tension when buckling across. As long as the actuator or connecting member 14 is moving against the spring the latter is progressively advancing in its spring shifting movement from the lower point of anchorage 18 toward the upper point, and when the advance has reached its critical point, the piston is still moving until finally the spring automatically continues its sinuous movement independently of the actuator 14 and whips the upper end away from one shoulder 21 to the companion shoulder with sufficient force and rapidity of movement to shift the valve 1 to its new position. After the sinuous movement has begun, the spring is free in itself to continue such movement automatically and independently of mechanical parts until the shoulder 21 in advance is impacted, and this impact is accomplished with sufficient force to readily accomplish the desired shift. By reason of the buckling action the normal length of the spring is practically maintained without subjecting it to abnormal compression or tension.

While the invention has been described much in detail, it will appear obvious that the inventive principles here involved will be applicable to other physical embodiments without departing from the invention or restricting the same beyond the scope of the appended claims.

What is claimed is:

1. A snap action for moving a power transmitting member back and forth between two positions, comprising a pair of stationary supports fixedly spaced, a spring anchored at each of its opposite ends on said supports and normally held in a laterally bowed position thereby, said spring adapted to be buckled to the opposite side of the plane of anchorage, means engageable with the bowed spring portion adjacent one point of anchorage for moving the adjacent end portion of the spring across such plane to initiate a progressive independent advance of a wave of spring motion toward the opposite point of anchorage with a sinuous movement whereby the opposite end portion of the spring is finally moved across such plane with a snap action, and means connecting such opposite end portion of the spring to said power transmitting member to effect a quick movement of the latter from one of its positions to its other position.

2. A snap action for moving a power transmitting member back and forth between two positions, comprising a spring anchored at its opposite ends on fixed points of support and normally held in a laterally bowed position thereby, means engaging with the bowed spring portion adjacent one point of anchorage for moving the adjacent end portion of the spring across the plane of spring anchorage to initiate a progressive advance toward the opposite point of anchorage of a wave of spring motion with a buckling sinuous movement whereby the opposite end portion of the spring is finally whipped across such plane solely by the inherent resiliency of the spring itself, and means providing a play connection between the whipped end portion and said power transmitting member to permit a preliminary idling movement of the whipped end portion prior to acting upon such power transmitting member to effect a shift of the latter from one of its positions to its other position.

3. A snap action comprising a power transmitting member movable from one to the other of two positions, a spring pivotally anchored at both ends and held under compression bowed to one side of the plane of anchorage solely by the inherent resiliency of the spring itself, said spring being movable to a bowed position on the opposite side of such plane with a sinuous movement by which a wave of motion advances from one anchored end to the opposite anchored end, means engaging the bowed portion adjacent one end for rocking such portion of the spring across the plane to initiate such sinuous movement of the spring and permitting a continuance of the sinuous movement automatically under the impulse of the spring independently of said initiating means, and means for connecting the bowed portion of the spring adjacent the opposite point of anchorage to said power transmitting member.

4. A snap action comprising a power transmitting member movable from one to the other of two positions, a spring pivotally anchored at both ends and held bowed to one side of the plane of anchorage under compression, said spring being movable by buckling to a bowed position on the opposite side of such plane with a sinuous movement, means acting on one end portion of the spring between its points of anchorage for buckling the same to initiate such sinuous movement and permitting a continuance of the sinuous movement automatically under the impulse of the spring independently of said initiating means, and means acted upon by the opposite end portion of the spring during the final part of the sinuous movement to so move said power transmitting member.

5. A snap action comprising a power transmitting member movable from one to the other of two positions, a spring pivotally anchored at both ends and normally held bowed to one side of the plane of anchorage under compression, said spring being movable by a progressive buckling initiated near one end and progressing with a sinuous movement to the opposite end to dispose the spring in a bowed position on the opposite side of such plane, means connecting the spring to the power transmitting member for actuating the latter by the final portion of such sinuous movement, and means for rocking one end portion independently of the other end portion to initiate the buckling movement of the spring.

6. A snap action having a spring clamped between spaced anchorages to bow the spring laterally and adapted to be buckled to the opposite side of the plane of anchorage with a wave of motion progressing from adjacent one point of anchorage toward the other point of anchorage, with means for initiating the wave of motion from one point of anchorage, and other means actuated by the spring during the wave of motion and subsequent to the initiation of such wave.

7. A snap action for moving a power transmitting member back and forth between two positions, comprising a spring anchored at its opposite ends and normally held in a laterally bowed position, said spring adapted to be buckled to the opposite side of the plane of anchorage, means engageable with the bowed spring portion adjacent one point of anchorage for moving the adjacent end portion of the spring across such plane to initiate a progressive independent advance of a wave of spring motion toward the opposite point of anchorage with a sinuous movement whereby the opposite end portion of the spring is finally snapped across such plane with a whip, means connecting such opposite end portion of the spring to said power transmitting member to effect a quick movement of the latter from one of its positions to its other position, and means for shifting one of the anchored ends laterally to a point from which said moving means is ineffective and said spring is thereby supported against such sinuous movement.

8. A snap action comprising a power transmitting member movable from one to the other of two positions, a spring pivotally anchored at both ends and held bowed to one side of the plane of anchorage under compression, said spring being movable by buckling to a bowed position on the opposite side of such plane with a sinuous movement, means engaging one portion of the spring for buckling the same to initiate such sinuous movement and permitting a continuance of the sinuous movement automatically under the impulse of the spring independently of said initiating means, means for connecting another portion of the spring to said power transmitting member for whipping action subsequent to said buckling whereby the member will be quickly shifted from one position to another, and means for shifting one of the anchored ends with respect to said buckling means to render the latter ineffective upon the spring whereby said spring is supported against operative buckling by said buckling means.

9. A snap action having a spring clamped between spaced anchorages to bow the spring laterally and adapted to be buckled to the opposite side of the plane of anchorage with a wave of motion progressing from adjacent one point of anchorage toward the other point of anchorage, with means for initiating the wave of motion, other means for being actuated subsequently by and during the wave of motion, and means for disposing said spring inoperative with respect to said initiating means whereby the latter is ineffective on said spring.

10. A snap action for moving a power transmitting member back and forth between two positions, comprising a spring supported at each of its opposite ends in a relatively non-resilient anchorage and normally adapted for one end portion of it to be buckled to the opposite side of the plane of anchorage, means engageable with the bowed spring portion adjacent one point of anchorage for moving the adjacent end portion of the spring across such plane to initiate a progressive independent advance of a wave of spring motion toward the opposite point of anchorage with a sinuous movement whereby the opposite end portion of the spring is finally snapped across such plane with a whip, and means connecting such opposite end portion of the spring to said power transmitting member to effect a quick movement of the latter from one of its positions to its other position.

ERWIN C. HORTON.